United States Patent

Suganuma

[11] Patent Number: 6,144,469
[45] Date of Patent: *Nov. 7, 2000

[54] METHOD OF AND APPARATUS FOR STORING IMAGE DATA

[75] Inventor: Atsushi Suganuma, Minamiashigara, Japan

[73] Assignee: Fuji Photo Film Co., Ltd., Kanagawa-Ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/923,406

[22] Filed: Sep. 4, 1997

[30] Foreign Application Priority Data

Sep. 18, 1996 [JP] Japan ................................. 8-246701

[51] Int. Cl.⁷ ..................................................... H04N 1/46

[52] U.S. Cl. ............................................................ 358/514

[58] Field of Search ................................... 358/514, 505, 358/525, 428, 482, 483; 382/318, 312, 319; 348/263

[56] References Cited

U.S. PATENT DOCUMENTS

| 4,734,759 | 3/1988 | Kobori et al. | 358/75 |
| 4,953,014 | 8/1990 | Takaragi | 358/451 |
| 5,014,093 | 5/1991 | Ng | 355/326 |
| 5,726,766 | 3/1998 | Saotome | 358/428 |
| 5,859,712 | 1/1999 | Kim | 358/514 |

*Primary Examiner*—Jerome Grant, II
*Attorney, Agent, or Firm*—Sughrue, Mion, Zinn, Macpeak & Seas, PLLC

[57] ABSTRACT

Corrective line quantities for compensating for differences between reading positions in an auxiliary scanning direction of linear image sensors of a 3-line image sensor are determined, and the determined corrective line quantities are divided into integer-part corrective line quantities and decimal-part corrective line quantities. The decimal-part corrective line quantities are interpolated in real-time by a hardware arrangement from preceding image data and presently read image data, using line buffer memories. The integer-part corrective line quantities are changed in addresses when they are stored as a file in a hard disk or the like, thus providing image data which are equalized in reading positions.

12 Claims, 12 Drawing Sheets

| ADDRESS | DATA | ADDRESS | DATA | ADDRESS | DATA |
|---------|------|---------|------|---------|------|
| F0 | Dr0' | E0 | Db0' | D0 | Dg0 |
| F1 | Dr1' | E1 | Db1' | D1 | Dg1 |
| F2 | Dr2' | E2 | Db2' | D2 | Dg2 |
| ⋮ | ⋮ | ⋮ | ⋮ | ⋮ | ⋮ |
|  |  | E8 | Db8' |  |  |
|  |  | E9 | Db9' |  |  |
|  |  | E10 | Db10' |  |  |
| ⋮ | ⋮ | ⋮ | ⋮ | ⋮ | ⋮ |
| F17 | Dr17' | E17 | Db17' | D17 | Dg17 |
| F18 | Dr18' | E18 | Db18' | D18 | Dg18 |
| ⋮ | ⋮ | ⋮ | ⋮ | ⋮ | ⋮ |

Sr → ADDRESS (F column), Sb → ADDRESS (E column), Sg → ADDRESS (D column), reference 8

METHOD OF AND APPARATUS FOR STORING IMAGE DATA

BACKGROUND OF THE INVENTION

1. Field of the Invention

The present invention relates to a method of and an apparatus for storing image data in a color image reading system which has three R, G, B linear image sensors housed in a single semiconductor package, each comprising an array of photoelectric transducer pixels arranged in a main scanning direction, for photoelectrically reading reflected or transmitted light which represents image information carried by a subject.

2. Description of the Related Art

Conventional color image reading systems operate by applying illuminating light to a subject placed on a subject table, guiding light representing image information carried by the subject as reflected or transmitted light to a focusing optical system, supplying the light to tricolor separating prisms, and photoelectrically reading the light with R (red), G (green), B (blue) linear image sensors mounted on respective exist surfaces of the tricolor separating prisms. The subject is read in a main scanning direction by the linear image sensors while at the same time the subject is moved relatively to the linear image sensors in an auxiliary scanning direction that is substantially perpendicular to the main scanning direction, so that two-dimensional image information of the colors R, G, B can be produced.

The conventional color image reading systems with the tricolor seperating prisms are advantageous in the they can read one line on the subject simultaneously with the three linear image sensors. The conventional color image reading systems need such three linear image sensors, and the tricolor separating prisms are highly expensive. It requires a highly sophisticated technique to install the three linear image sensors on the tricolor separating prisms in optical alignment.

Therefore, the overall cost, including the installation cost, of the conventional color image reading systems with the three linear image sensors and the tricolor separating prisms is relatively large.

Figure 9:
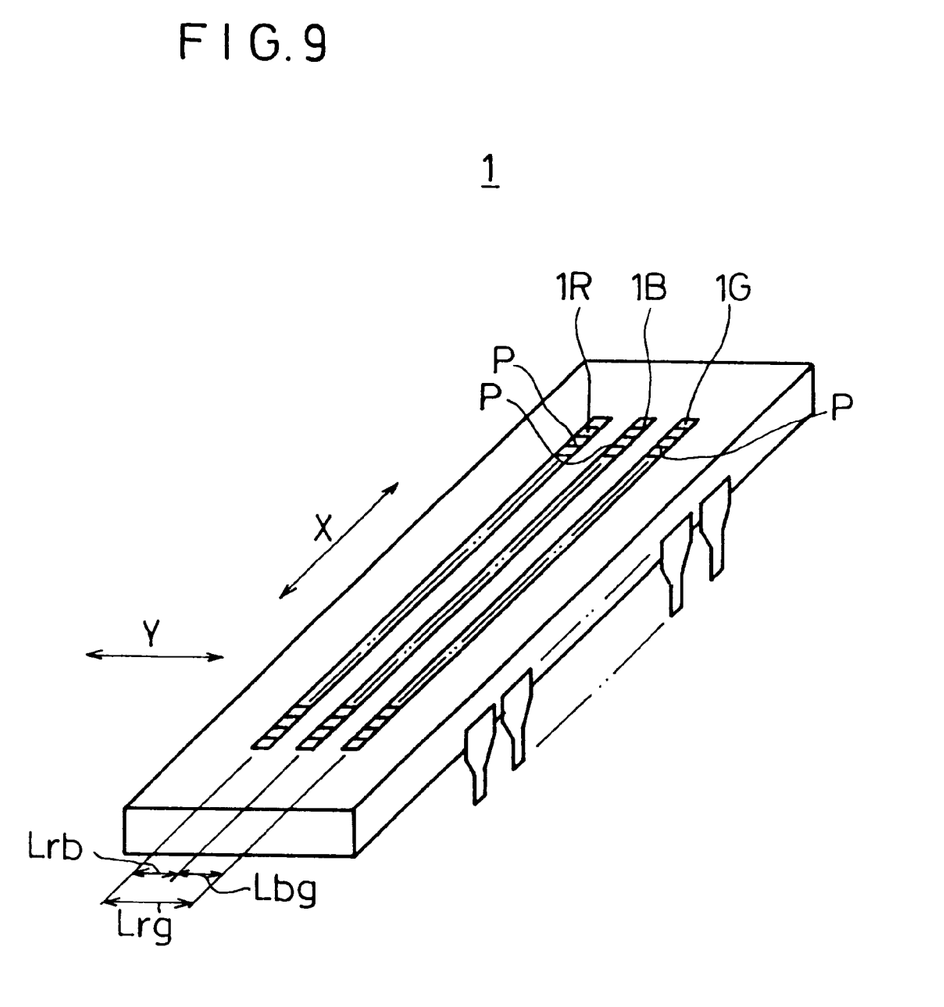
FIG. 9 is a perspective view of a general 3-line image sensor.

In an attempt to solve the above problems, there has recently been proposed a 3-line image sensor (or a 3-line linear image sensor) 1 of semiconductor package structure which, as shown in FIG. 9 of the accompanying drawings, R. G. B linear image sensors 1R, 1G, 1B fabricated parallel to each other on a single semiconductor substrate and housed in a single package. The R, G, B linear image sensors 1R, 1G, 1B has respective photodetectors comprising respective arrays of several thousand photoelectric transducer pixels joined in a main scanning direction X (also referred to as a "line direction"), and respective R, G, B filters (not shown) mounted respectively on the photodetectors.

The 3-line image sensor 1 is capable of, by itself, separating three colors from applied light and photoelectrically reading the applied light in the main scanning direction. The linear image sensor 1G and the linear image sensor 1B are spaced a distance Lbg of several tens $\mu$m. for example, from each other in an auxiliary scanning direction Y perpendicular to the main scanning direction X, and the linear image sensor 1B and the linear image sensor 1R are spaced a distance Lrb of several tens $\mu$m, for example, from each other in the auxiliary scanning direction Y. Usually, the distance Lbg is equal to the distance Lrb. Therefore, the linear image sensor 1G and the linear image sensor 1R are spaced a distance Lrg which is equal to 2·Lbg=2·Lrb.

With the 3-line image sensor 1 incorporated in a conventional color image reading system, the conventional color image reading system requires no tricolor separating prisms, and hence needs no time and process to install the image sensor on tricolor separating prisms.

Figure 10:
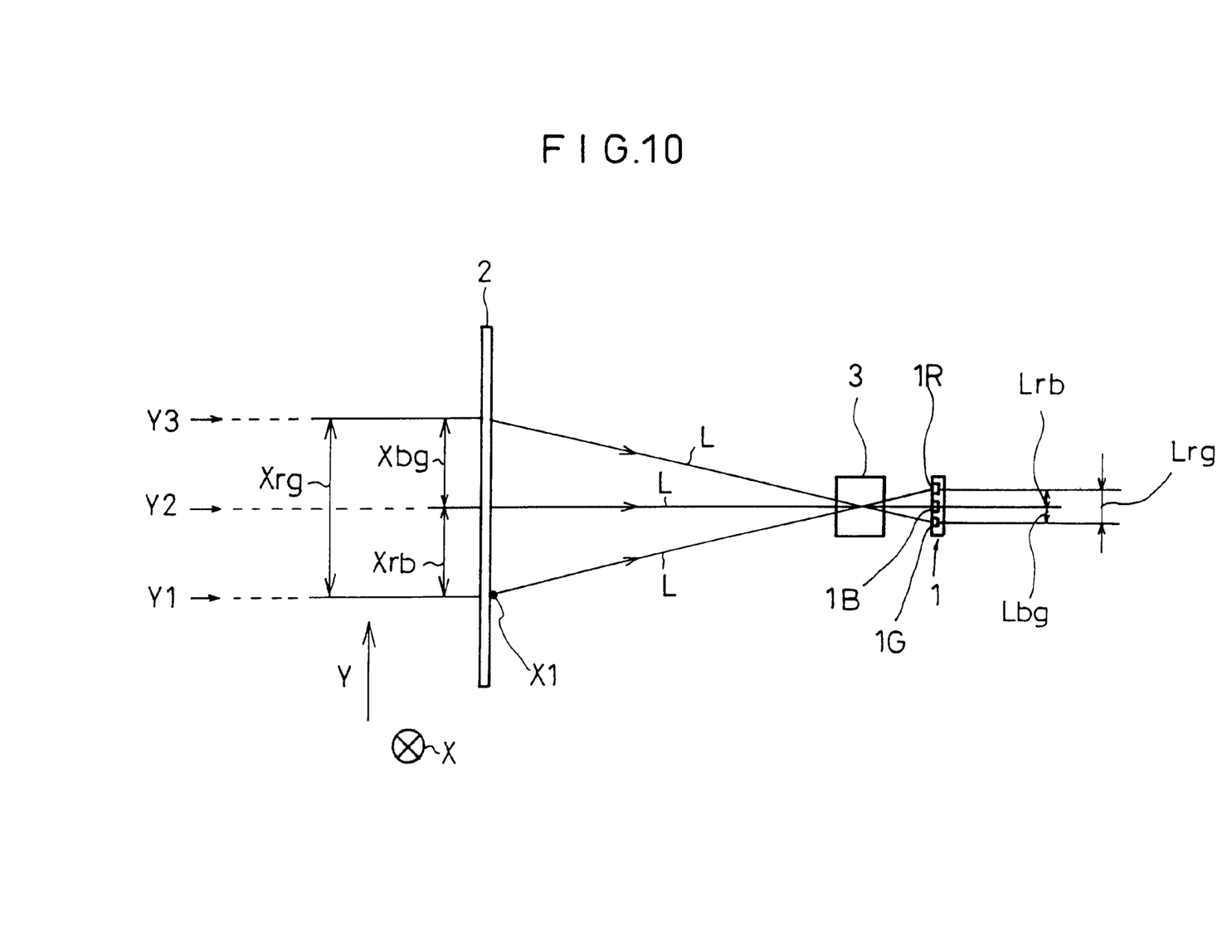
FIG. 10 is a diagram illustrative of differences between reading positions where a subject is read by a 3-line image sensor.

However, since the linear image sensors 1R, 1G, 1B are spaced from each other in the auxiliary scanning direction Y. as shown in FIG. 10 of the accompanying drawings, they cannot simultaneously read an image X1 (extending in a direction normal to the sheet of FIG. 10) of a line on a subject 2 that is fed in the auxiliary scanning direction Y.

Specifically, light L containing image information on the subject 2 that is being fed in the auxiliary scanning direction Y is led through a focusing optical system 3 to the linear image sensors 1R, 1G, 1B of the 3-line image sensor 1. The image X1 which is borne by the light L is first read at a position YI along the auxiliary scanning direction Y by the linear image sensor 1R, and then read at a position Y2, spaced from the position Y1 by a distance Xrb, along the auxiliary scanning direction Y by the linear image sensor 1B. Finally, the image X1 is read at a position Y3, spaced from the position Y2 by a distance Xbg and from the position Y1 by a distance Xrg, along the auxiliary scanning direction Y by the linear image sensor 1G. In FIG. 10, the distances Xrb, Xbg, Xrg are related to each other such that Xrb=Xbg, Xrg=2·Xrb=2·Xbg. It should be noted that when the magnification (reading resolution) of the focusing optical system 3 is varied, the differences between the positions along the auxiliary scanning direction Y where the subject 2 is read are also varied.

The image information thus read is photoelectrically converted by the linear image sensors 1R, 1G, 1B into an image signal that is converted by an A/D converter (not shown) into digital image data. The digital image data are then stored in an external memory such as a hard disk or the like.

When the digital image data are stored in the external memory, it is preferable to store the digital image data in the external memory such that the differences between the reading positions of the linear image sensors 1R, 1G, 1B along the auxiliary scanning direction Y are compensated for, i.e., to store digital image data as files in the external memory.

There are two techniques available for storing digital image data in the external memory such that the differences between the reading positions of the linear image sensors 1R, 1G, 1B along the auxiliary scanning direction Y are compensated for.

For an easier understanding of these two techniques, it is assumed that the distance Xrb corresponds to 10.1 lines on the subject and distance Xrg corresponds to 20.2 lines on the subject.

Figure 11:
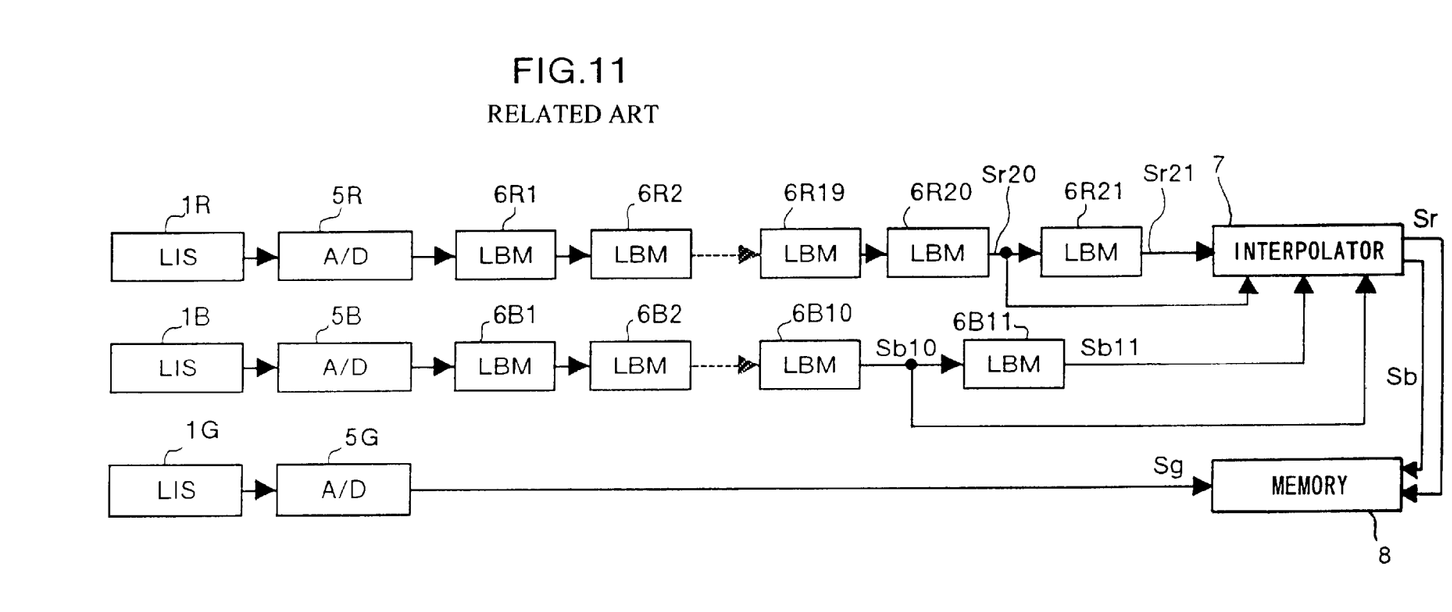
FIG. 11 is a block diagram of a conventional arrangement for compensating for differences between reading positions of linear image sensors.

According to the first technique, as shown in FIG. 11 of the accompanying drawings, the linear image sensor 1G which finally reads the image X1 is used as a reading position reference, and an output signal from the linear image sensor 1G is converted by an A/D converter 5G into digital image data Sg that is stored for each main scanning line directly into a memory 8 such as a hard disk or the like. The memory 8 is capable of storing digital image data of one frame.

The linear image sensor 1R which first reads the image X1 is connected through an A/D converter 5R to 21 line buffer memories 6R1~6R21 which comprise semiconductor memories for storing digital image data corresponding to 21 lines. The linear image sensor 1B which next reads the image X1 is connected through an A/D converter 5B to 11 line buffer memories 6B1~6B11 which comprise semiconductor memories for storing digital image data corresponding to 11 lines. Each of these line buffer memories is capable of storing data corresponding to more words than the number of the photoelectric transducer pixels, e.g., 5k words, each word being of bits, e.g., 16 bits, greater than the resolution of the A/D converter.

In order to store image data Sb from the linear image sensor 1B at the same reading position as the image data Sg of the linear image sensor 1G as the reading position reference, image data of the same pixel number of front and rear lines are read from the line buffer memories 6B10, 6B11 and then interpolated by an interpolator 7, and the interpolated image data that are 10.1 lines prior to the image data Sg of the linear image sensor 1G are stored as image data Sb in the memory 8.

Specifically, the interpolator 7 calculates image data Sb from the image data Sb10, Sb11 of the same pixel number of front and rear lines according to the following weighting interpolation equation (1):

$$Sb = 0.1 \cdot Sb10 + (1-0.1) \times Sb11 \qquad (1)$$

Similarly, the interpolator 7 calculates image data Sr from the image data Sr20, Sr21 of the same pixel number of front and rear lines according to the following weighting interpolation equation (2):

$$Sr = 0.2 \cdot Sr20 + (1-0.2) \times Sr21 \qquad (2)$$

Figure 12:
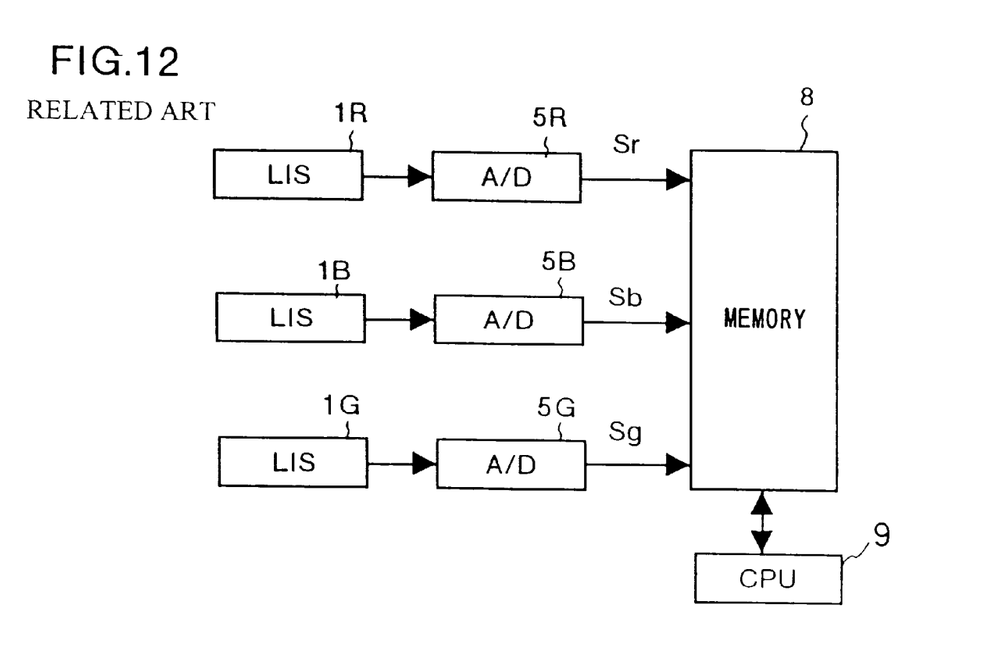
FIG. 12 is a block diagram of another conventional arrangement for compensating for differences between reading positions of linear image sensors.

According to the second technique, as shown in FIG. 12 of the accompanying drawings, no line buffers are employed, but image data Sr, Sg, Sb are stored in their entirety in a memory 8 such as a hard disk or the like, and then interpolated according to the above equations (1), (2) by a CPU 9. The interpolated image data are then stored as files at the same reading position in the memory 8.

Since the first technique shown in FIG. 11 uses the interpolator 7, it allows the image data Sr, Sg, Sb to be stored in real-time as files into the memory 8, and hence permits the stored image data to be processed at high speeds. However, since the many line buffer memories which comprise semiconductor memories are required, the first technique is highly costly to carry out. For high-resolution image data processing, because the speed at which the subject 2 is fed in the auxiliary scanning direction X is reduced, the differences, i.e., the distances Xbg, Xrg, between the reading positions on the subject 2, are increased, resulting in a need for more line buffer memories.

The second technique shown in FIG. 12 suffers a less memory cost because it needs no line buffer memories. However, the time required to carry out interpolating calculations according to the equations (1), (2) is considerably long, and hence the second technique fails to perform high-speed image data processing. As a result, it takes a long time until the image data are stored as files, resulting in a reduction in image data productivity.

SUMMARY OF THE INVENTION

It is therefore an object of the present invention to provide a method of and an apparatus for storing image data using line buffer memories of a minimum cost to compensate for differences between reading positions of a plurality of linear image sensor such as of a 3-line image sensor, while allowing image data to be processed at high speed, i.e., in real-time.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

The present invention will be described below with reference to FIGS. 1 through 8. Those parts shown in FIGS. 1 through 8 which are identical to those shown in FIGS. 9 through 12 are denoted by identical reference numerals, and will not be described in detail. FIGS. 9 through 12 will also be referred to if necessary in the description of the present invention.

Figure 1:
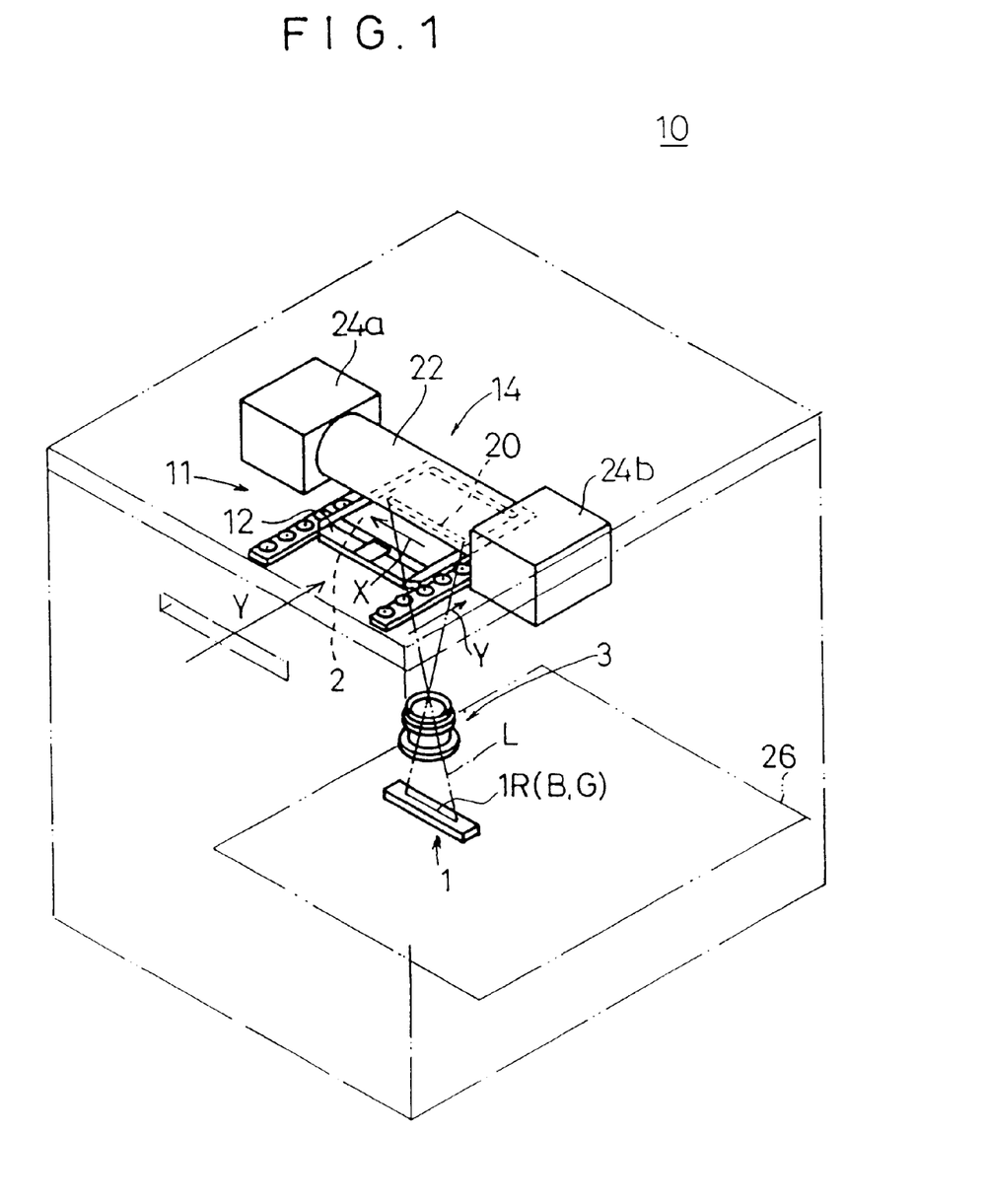
FIG. 1 is a perspective view of an image reading system to which the present invention is applied.

FIG. 1 shows a basic structure of an image reading system 10 to which the present invention is applied. The image reading system 10 has a feed mechanism 11 which moves a subject cassette 12 in the direction indicated by the arrow Y (auxiliary scanning direction Y) and an illuminating optical system 14 which applies illuminating light to the subject cassette 12 in the direction indicated by the arrow X (main scanning direction X). Image information recorded on a transmissive subject 2 which is carried by the subject cassette 12 is carried by transmitted light L, which is focused onto a 3-line image sensor 1 such as a CCD by a focusing optical system 3 that comprises a plurality of condenser lenses and is operable as a zoom lens system. The 3-line image sensor 1 comprise R, G, B linear image sensors 1R, 1G, 1B which convert the focused light L to an electric signal. The 3-line image sensor 1 is of the same structure as the 3-line image sensor shown in FIG. 9. The electric signal (photoelectrically converted signal) produced by the 3-line image sensor 1 is supplied through a flexible printed wiring board (not shown) to an image signal processing board 26 which supports A/D converters (described later on).

The illuminating optical system 14 comprises a cylindrical diffusion chamber 22 having an inner light diffusion surface and a longitudinal slit 20, and a pair of light sources 24a, 24b mounted on the respective opposite ends of the cylindrical diffusion chamber 22 and each comprising a halogen lamp or the like.

Figure 2:
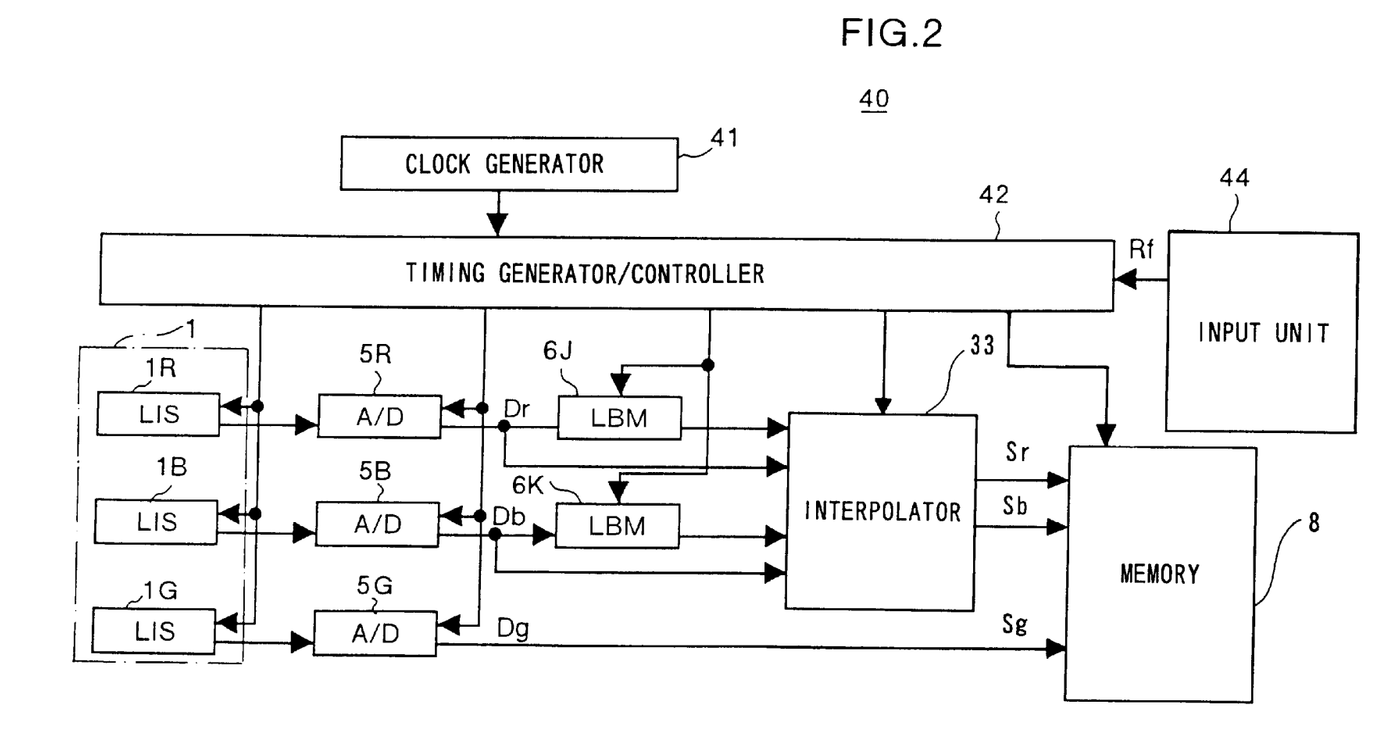
FIG. 2 is a block diagram of an image data storage control apparatus in the image reading system shown in FIG. 1.

FIG. 2 shows a basic structure of an image data storage control apparatus 40 in the image reading system 10, for storing electric signals (pixel signals) produced for respective pixels from the linear image sensors 1R, 1B, 1G into a memory 8 such as a hard disk or the like, while compensating for differences between reading positions of the linear image sensors 1R, 1B, 1G.

As shown in FIG. 2, a basic clock signal is generated by a clock generator 41 and supplied to a timing generator/controller (drive controller) 42. The timing generator/controller 42 has a timing signal generator as a timing control means including a line counter and an address counter, and a CPU serving as control, decision, and calculation means. The CPU comprises a microprocessor including a ROM, a RAM, etc. The ROM comprises a rewritable ROM, and the RAM comprises a backed-up RAM.

The timing generator/controller 42 generates various timing signals for energizing the linear image sensors 1R, 1B, 1G, etc., and also generates addressing signals for line buffer memories 6J, 6K and a memory 8, and a weighting coefficient based on a decimal part corrective line quantity for an interpolator 33. The linear image sensors 1R, 1B, 1G are supplied with shift pulses for transferring photoelectrically converted charges from the photoelectric transducer pixels P (see FIG. 9) to charge transfer units (not shown) in the form of analog shift registers, a transfer clock signal for transferring the charges supplied to the charge transfer units to output units, and reset pulses for converting the charges into voltages at final stages of the linear image sensors 1R, 1B, 1G. The image data storage control apparatus 40 has A/D converters 5R, 5B, 5G which are supplied with a pixel clock signal as a sampling clock signal in synchronism with the transfer clock signal. Each of the line buffer memories 6J, 6K may be identical to one of the line buffer memories 6R1~6R21, 6B1~6B11 shown in FIG. 11. The memory 8 may comprise a hard disk, a magnetooptical disk, or the like.

To the timing generator/controller 42, there is connected an input unit 44 such as a keyboard or the like for indicating a reading resolution Rf (dots/mm, "dot" meaning a pixel) for the subject S (see FIGS. 1 and 10).

Figure 3:
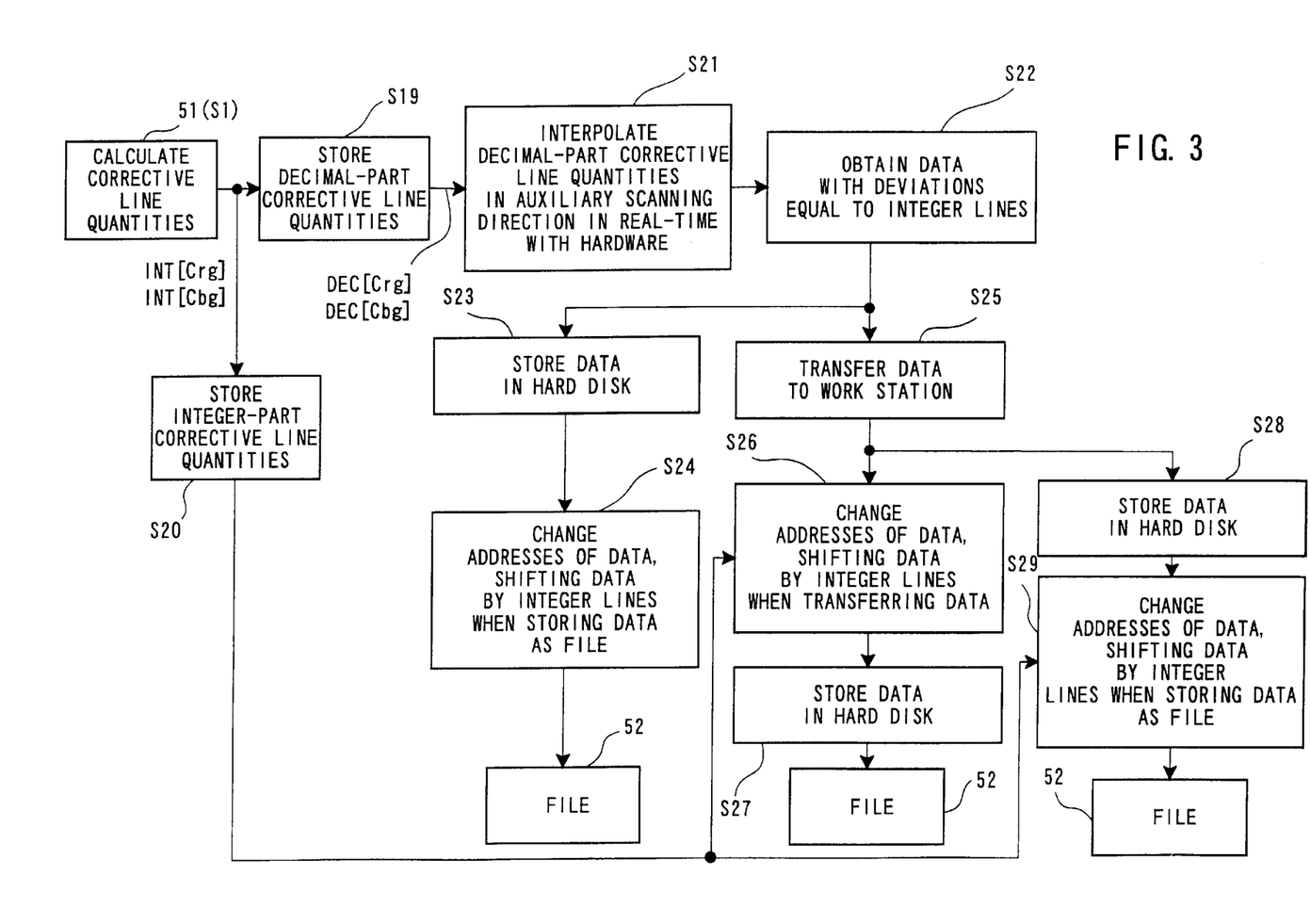
FIG. 3 is a flowchart of an operation sequence, including functional blocks, of the image data storage control apparatus shown in FIG. 2.

Operation of the image reading system 10 and the image data storage control apparatus 40 will be described below with reference to FIG. 3. Decisions are made by the CPU of the timing generator/controller 42. The ROM of the CPU stores various data and a system program, and the RAM of the CPU serves to store processed data. Each of the ROM and the RAM, which may comprise a flash memory or the like, can be controlled by the CPU for writing and reading data.

Using the linear image sensor 1G which finally reads an image X1 (see FIG. 10) on the subject 2 as a reference, a corrective line quantity for the linear image sensors 1B, 1R is determined as an integer-part corrective line quantity and a decimal-part corrective line quantity by a corrective line quantity calculating unit 51 (which is software-implemented in the timing generator/controller 42) in a step S1.

Figure 4:
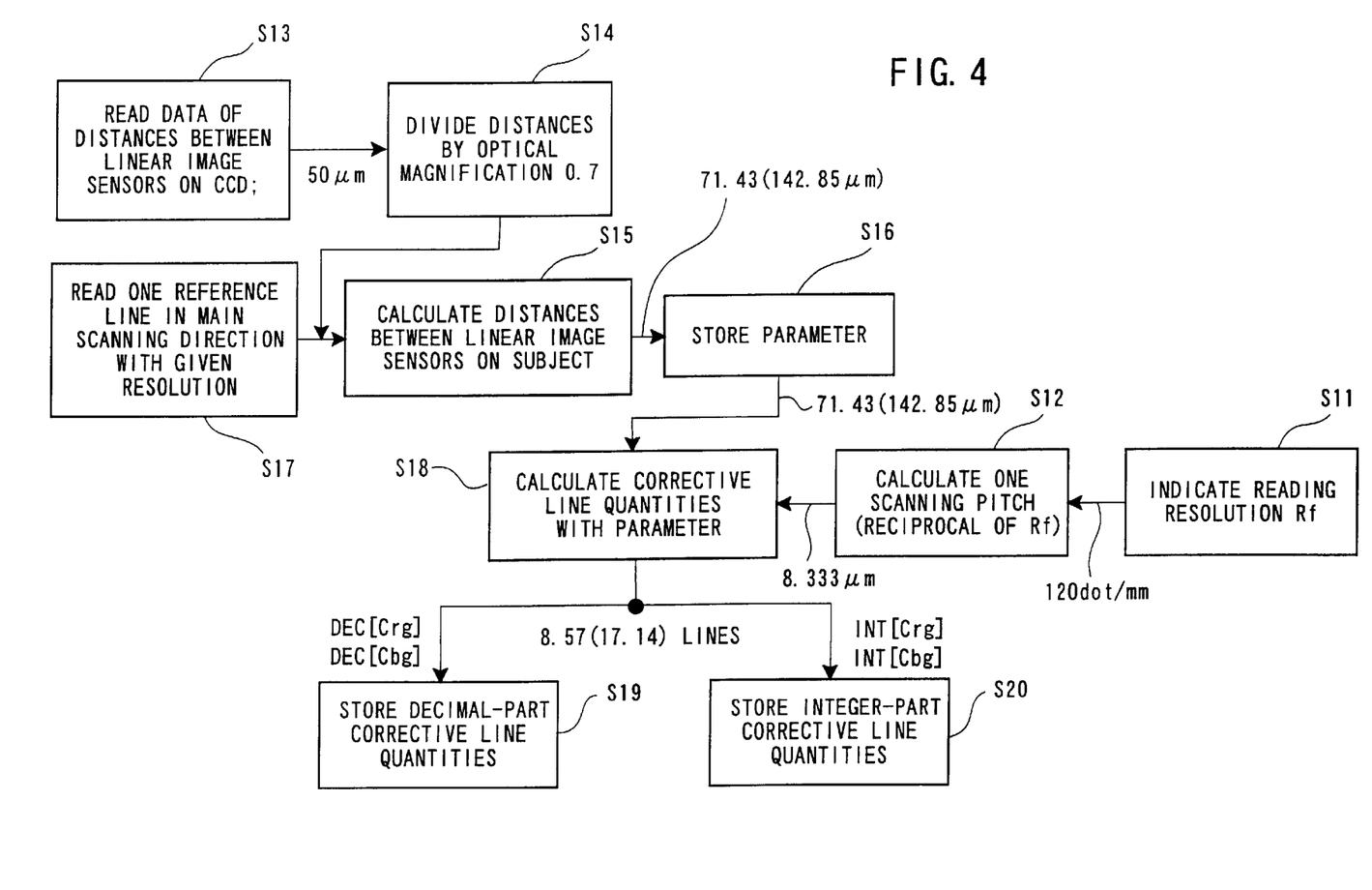
FIG. 4 is a flowchart of a process, including functional blocks, of calculating a corrective line quantity in the operation sequence shown in FIG. 3.

FIG. 4 shows a process, including functional blocks, of calculating a corrective line quantity which is carried out by the corrective line quantity calculating unit 51.

It is assumed that a corrective line quantity to be calculated is represented by C. The corrective line quantity C varies depending on a reading resolution Rf that is indicated by the input unit 44. If the reading resolution Rf is higher, the speed at which the subject 2 is fed in the auxiliary scanning direction Y is lower, resulting in a need for an increase in the corrective line quantity C. In the illustrated embodiment, the reading resolution Rf is indicated as Rf=120 dots/mm in a step S11. A scanning pitch SP in the auxiliary scanning direction Y. i.e., a 1-scanning pitch (1-line pitch), is calculated as the reciprocal of the reading resolution Rf. Therefore, the scanning pitch SP is calculated as SP=1/Rf=1/120=8.333 $\mu$m in a step S12.

As shown in FIGS. 9 and 10, the linear image sensor 1G and the linear image sensor 1B are spaced the distance Lbg from each other in the auxiliary scanning direction Y. and the linear image sensor 1B and the linear image sensor 1R are spaced the distance Lrb from each other in the auxiliary scanning direction Y. The distance Lbg is equal to the distance Lrb, and the linear image sensor 1G and the linear image sensor 1R are spaced the distance Lrg=2-Lbg. In the illustrated embodiment, Lrb=Lbg=50 $\mu$m, and Lrg=100 $\mu$m. Data of these distances are read from the ROM of the timing generator/controller 42 in a step S13. The distances Lrb, Lbg, Lrg comprise distances on the surface of the linear image sensor 1, i.e., distances on the surface of the CCD.

It is assumed that the magnification (optical magnification) of the focusing optical system 3 is 0.7. The distances Xrb, Xbg (Xbg=Xrb), Xrg (see FIG. 10) between the linear image sensors 1R, 1G, 1B on the surface of the subject 2 are calculated by dividing the distances Lrb, Lrg on the surface of the CCD by the optical magnification in a step S15. Specifically, Xrb=Lrb/optical magnification=50 $\mu$m/0.7=7.43 $\mu$m, Xrg=Lrg/optical magnification=100 $\mu$m/0.7=142.85 $\mu$m. These values are stored beforehand as a parameter Par (Par=7.43 $\mu$m, 142.85 $\mu$m) in the ROM of the timing generator/controller 42 in a step S16. The parameter Par is peculiar to the image reading system 10.

The subject 2 which carries one straight line (which is several lines thick, for example, in the auxiliary scanning direction Y) extending in the main scanning direction X as an image is read by the image reading system 10 without a correcting process based on a corrective line quantity, i.e., output signals from the A/D converters 5R, 5G, 5B are actually read directly with the indicated reading resolution Rf in a step S17. From the read signals, image data files for respective pixels on each main scanning line are generated in the memory 8. Based on the generated image data files, a line deviation along the auxiliary scanning direction Y, i.e., a corrective line quantity C, is determined between the pixels of the reference linear image sensor 1G and the pixels of the same pixel numbers of the other linear image sensors 1R, 1B.

Figure 5:
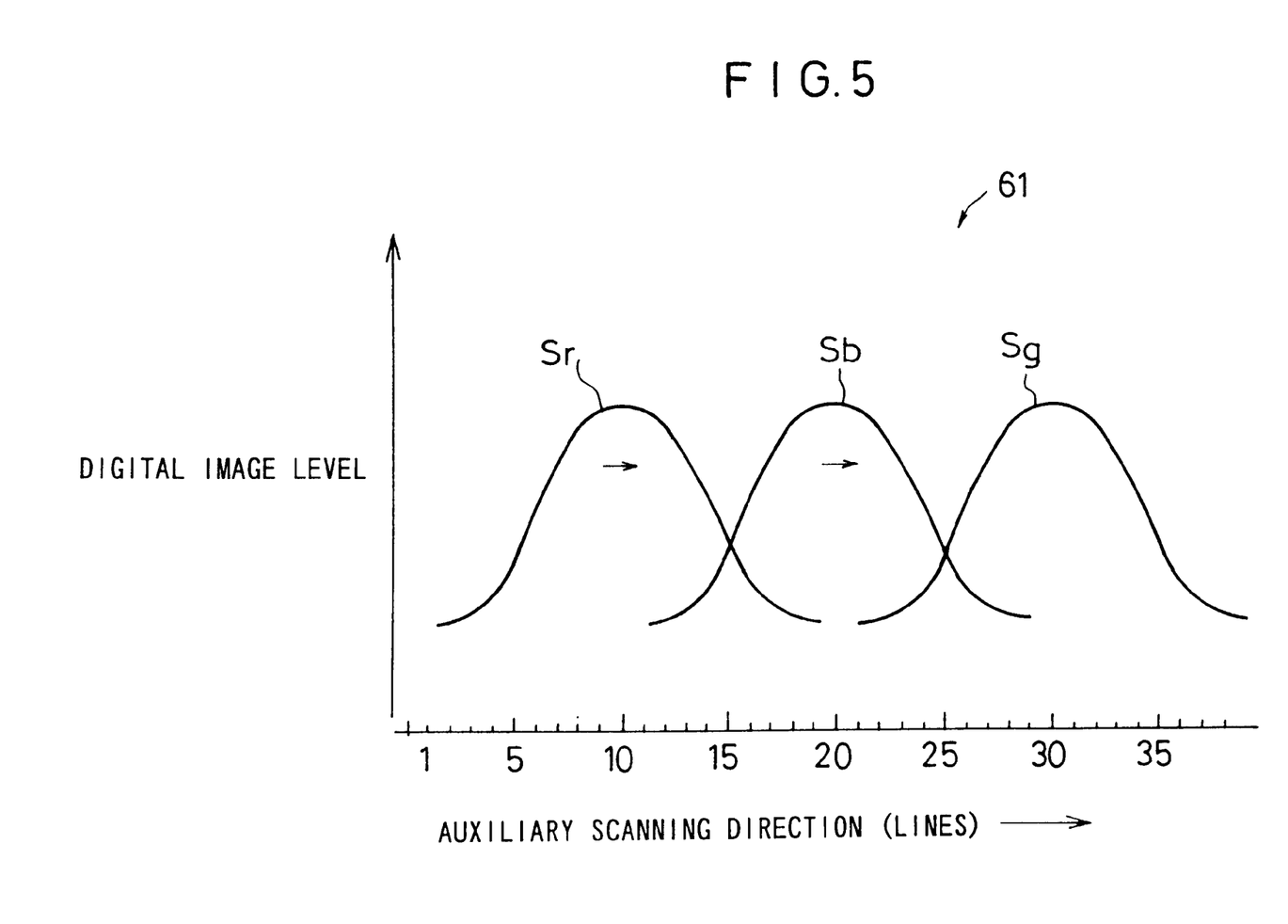
FIG. 5 is a diagram showing image data files illustrative of the process of calculating a corrective line quantity.

FIG. 5 schematically shows in an analog fashion image data Sr, Sb, Sg stored in an image data file 61 with respect to pixels of a certain pixel number. In FIG. 5, the horizontal axis represents a line number and the vertical axis a digital image level as converted into a density level. The line number, which represents addresses in the auxiliary scanning direction Y in the image data file 61, is in a range in which the image of the straight line on the subject can be read as upwardly convex image data Sr, Sb, Sg as shown in FIG. 5. Since the image data Sr, Sb, Sg are obtained for every line, the image data Sr, Sb, Sg are interpolated between the lines so that they are obtained in terms of 0.01 line. With respect to the reference image data Sg, the image data Sb, for example, is shifted 0.01 line in the direction indicated by the arrow, and the image data Sb is subtracted from the image data Sg at each shifted position. A deviation where the difference is minimum is used as a corrective line quantity C in the auxiliary scanning direction. Similarly, a corrective line quantity C for the image data Sr with respect to the image data Sg is calculated.

The corrective line quantity C thus determined is multiplied by the reciprocal of the indicated reading resolution Rf, i.e., the scanning pitch SP, to determine the distances Xrb (=Xbg), Xrg on the subject 2 in the step S15. The determined distances are stored as the parameter Par in the ROM or the RAM in the step S16. According to this process of using the image data file 61, the distances Xrb, Xrg on the subject are determined taking into account the optical magnification of the focusing optical system, so that the corrective line quantity C can be calculated with high accuracy in a step S18.

The parameter Par with respect to the corrective line quantity C is determined as described above. The parameter Pa is usually calculated when the image reading system 10 is assembled and adjusted before it is finally completed.

Then, when a reading resolution Rf as an exposure condition is indicated as Rf=120 dots/mm by the user through the input unit 44 of the completed image reading system 10 in the step S11, the scanning pitch SP is calculated as SP=8.333 μm in the step S12. Therefore, the corrective line quantity C is calculated by dividing the parameter Par=the distance Xrb=71.43 μm and the parameter Par=the distance Xrg=142.85 μm by the scanning pitch SP in the step S18.

Specifically, the corrective line quantity C (corrective line quantity Cbg) for the linear image sensor 1B with respect to the reference linear image sensor 1G is calculated as Cbg= Xrb (Xbg)/SP=71.43/8.333=8.57 lines, and the corrective line quantity C (corrective line quantity Crg) for the linear image sensor 1r with respect to the reference linear image sensor 1G is calculated as Crg=Xrg/SP=142.85/8.333=17.14 lines.

In this embodiment, the corrective line quantities Cbg, Crg are stored as integer-part corrective line quantities INT[Cbg], INT[Crg] and decimal-part corrective line quantities DEC[Cbg], DEC[Crg] in the RAM in steps S19, S20. The reference characters INT[Cbg] represent the integer part of the corrective line quantity Cbg, and the reference characters DEC[Cbg] represent the decimal part of the corrective line quantity Cbg. Therefore, the corrective line quantities C=Cbg, Crg can be expressed by the following respective equations (3), (4):

$$Cbg=INT[Cbg]+DEC[Cbg]=8+0.57 \quad (3)$$

$$Crg=INT[Crg]+DEC[Crg]=17+0.14 \quad (4)$$

The process of calculating the corrective line quantities C=Cbg, Crg will be described in detail below. The step S11 of indicating the reading resolution Rf, the step S12 of calculating the scanning pitch SP, and the steps S18~S20 of calculating the corrective line quantities C are carried out each time the user's exposure condition (reading resolution Rf) is established.

Based on the corrective line quantities Cbg, Crg thus determined, the hardware of the line buffer memories 6J, 6K and the interpolator 33 in the image data storage control apparatus 40 shown in FIG. 2 interpolates pixel data in the auxiliary scanning direction Y with respect to the decimal parts DEC[Cbg], DEC[Crg] in a step S21. Specifically, the hardware of the line buffer memories 6J, 6K and the interpolator 33 interpolates pixel data of the same pixel number of front and rear lines from the linear image sensors 1R, 1B.

Figure 6:
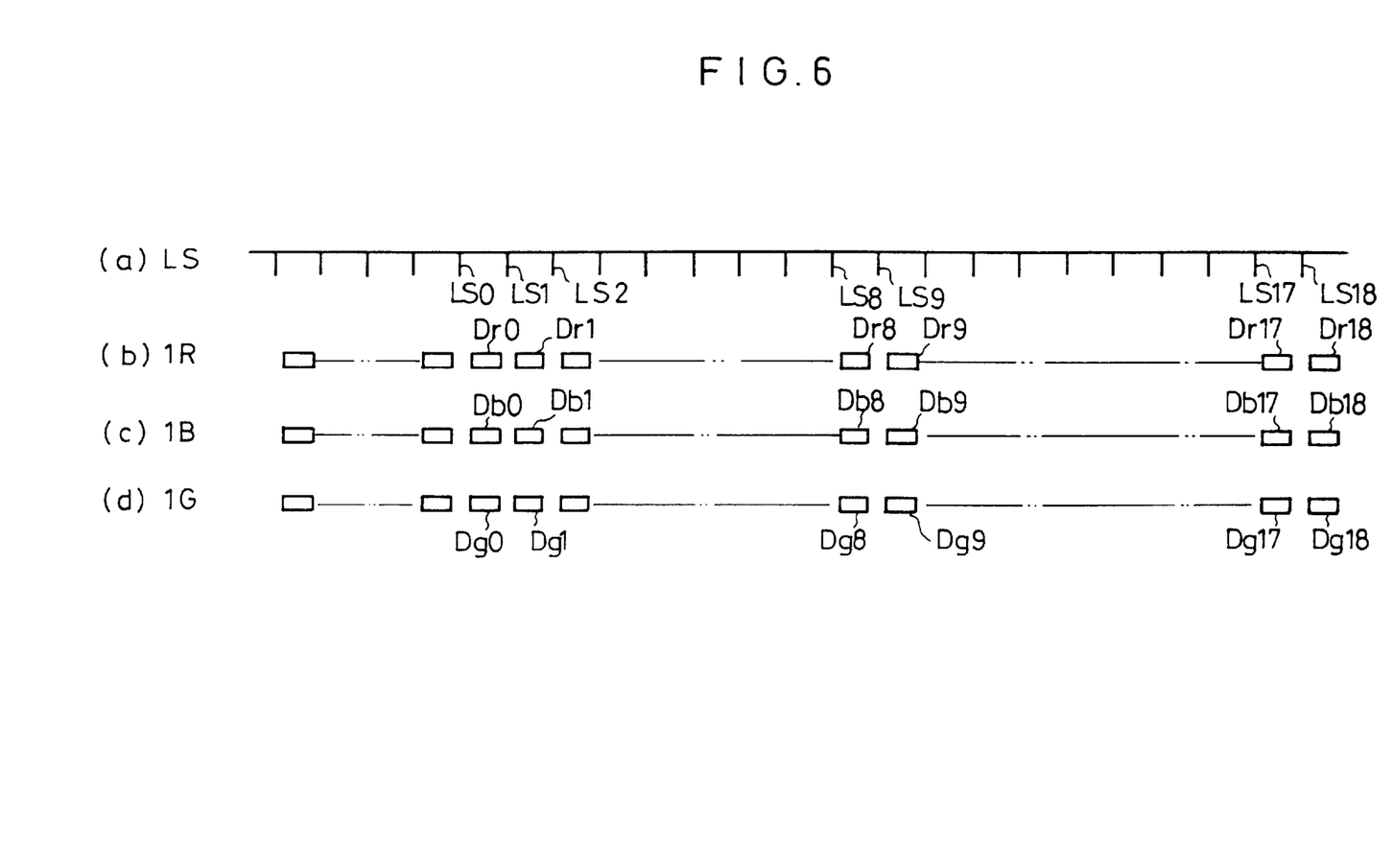
FIG. 6 is a timing chart illustrative of the process of calculating a corrective line quantity.

As shown in FIG. 6, it is assumed that at respective pulses of a line sync signal LS (see (a) in FIG. 6) generated by the timing generator/controller 42. for respective main scanning lines, R digital image data DrN (N=..., 0, 1, ..., 17, 18) (see (b) in FIG. 6), B digital image data DbN (N= ..., 0, 1..., 17, 18) (see (c) in FIG. 6), and G digital image data DgN (N= ..., 0, 1, ..., 17, 18) (see (d) in FIG. 6) are simultaneously produced by the respective A/D converters 5R, 5B, 5G.

The R image data Dr are interpolated into image data Dr1' according to the equation (5), given below, from image data Dr1 stored in the line buffer memory 6J and image data Dr0 of a preceding line that is being read and outputted from the A/D converter 5R. This interpolation is effected on each pixel data of the same pixel number of the image data Dr0, Dr1. In view of this, the image data DrN, DbN, DgN will also be referred to as pixel data DrN, DbN, DgN when necessary. The decimal-part corrective line quantities DEC [Cbg], DEC[Crg] are supplied as weighting coefficients from the timing generator/controller 42 to the interpolator 33.

$$Dr1'=DEC[Crg] \times Dr0+(1-DEC[Crg]) \times Dr1=0.14 \times Dr0+(1-0.14) \times Dr1 \quad (5)$$

At the same time, the B image data Db are interpolated into image data Db1' according to the equation (6), given below, from image data Db1 stored in the line buffer memory 6K and image data Dr0 of a preceding line that is being read and outputted from the A/D converter 5B.

$$Db1'=DEC[Cbg] \times Db0+(1-DEC[Cbg]) \times Db1=0.57 \times Db0+(1-0.57) \times Db1 \quad (6)$$

Interpolated image data Dr2', Db2' of a next line are obtained according to the equations (7), (8), given below, from front and rear image data Dr1, Dr2 and front and rear image data Db1. Db2.

$$Dr1'=0.14 \times Dr1+(1-0.14) \times Dr2 \quad (7)$$

$$Db1'=0.57 \times Db1+(1-0.57) \times Db2 \quad (8)$$

Subsequent interpolated image data DrN', DbN' can similarly be calculated in real-time. These interpolating calculations produce image data (pixel data) with line deviations corresponding to integer lines in a step S22.

The interpolated image data DrN', DbN' and reference image data Dgn are successively stored as image data Sr, Sb, Sg in the memory 8 in a step S23. When the image data Sr, Sb, Sg are successively stored in the memory 8, storage addresses are changed in a step S24, generating an image data file 52.

Figure 7:
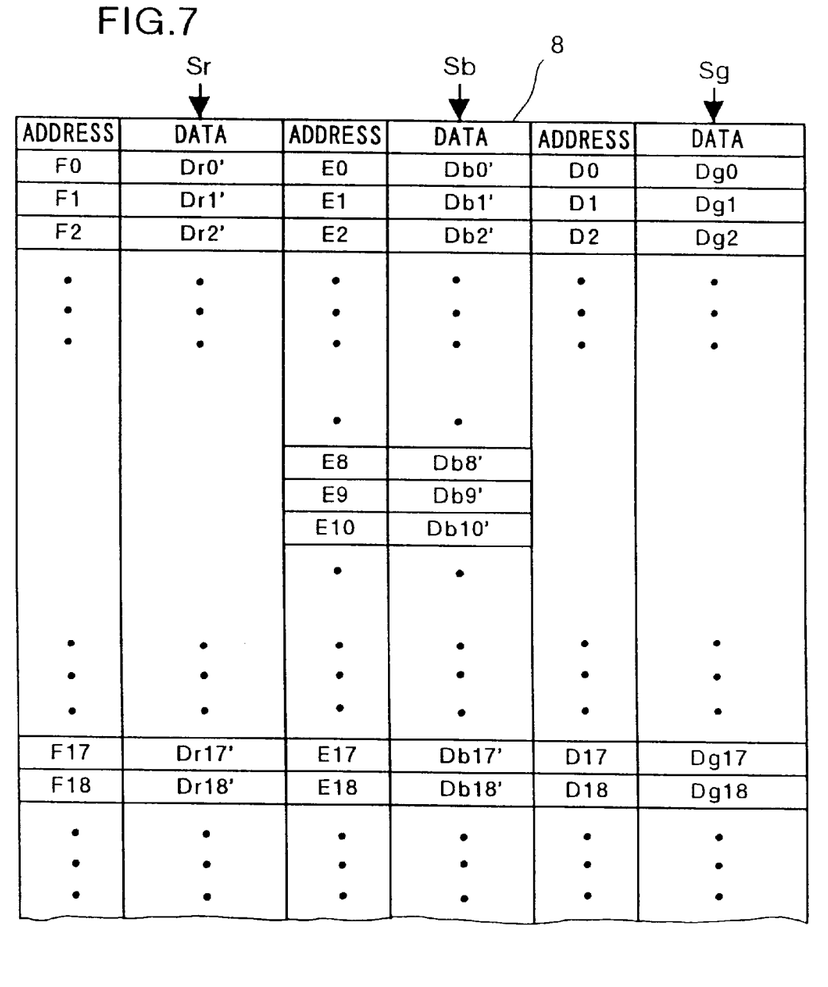
FIG. 7 is a diagram illustrative of a stored state of data prior to an address change.

FIG. 7 shows a table of addresses and data successively stored in the memory 8 when addresses are not changed. For example, G image data Dg0~Dg18 as reference image data are stored at respective addresses D0~D18, B image data Db0'~Db18' that have been interpolated are stored at respective addresses E0~E18, and R image data Dr0'~Dr18' that have been interpolated are stored at respective addresses F0~F18.

Actually, in order to use the image data Sr, Sb, Sg outputted from the interpolator 33 and the A/D converter 5G as image data files, their addresses are changed on the basis of the integer-part corrective line quantities INT[Crg]=14 and INT[Cbg]=8, shifting the image data by integer lines, and the image data are stored as an image data file 52 in the memory 8 in real-time in the step S24.

Figure 8:
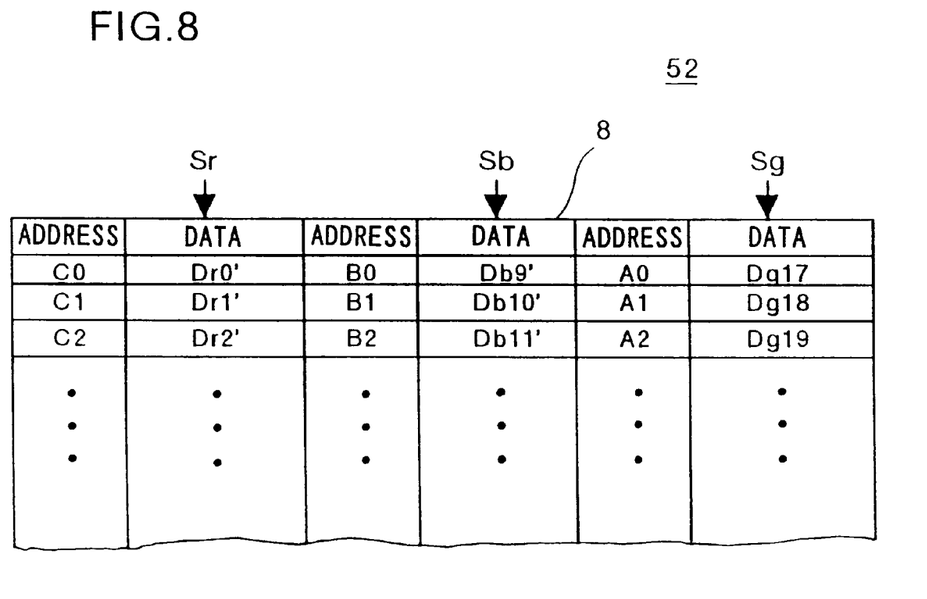
FIG. 8 is a diagram illustrative of image data files after an address change.

FIG. 8 shows the image data file 52 of the image data Sr, Sb, Sg, whose addresses have been changed, stored in the memory 8.

For example, the reference G image data Dg17 is stored at an address A, the interpolated image data Db9' which has been equalized in the reading position to the G image data Dg17 is stored at an address B0, and the interpolated image data Dr0' which has been equalized in the reading position to the G image data Dg17 is stored at an address C0.

While the image data file 52 is generated in the memory 8 of the image reading system 10 in the illustrated embodiment, the image data file 52 may be generated externally. Specifically, the image data produced by the interpolator 33 in the step S22 are transferred directly to a work station (not shown), not through the memory 8, in a step S25. When the image data are transferred, their addresses are changed to shift the image data by the integer-part corrective line quantities INT[Crg], INT[Cbg] in a step S26. Then, the image data are stored in a hard disk or the like of the work station in a step S27. The image data thus stored may be used as the image data file 52. Alternatively, the image data produced by the interpolator 33 in the step S22 are transferred directly to a work station (not shown), not through the memory 8, in the step S25. When the image data are stored in a hard disk or the like of the work station, their addresses are changed to shift the image data by the integer-part corrective line quantities INT[Crg], INT[Cbg] in steps S28, 29. Then, the image data thus stored may be used as the image data file 52.

In the above embodiment, the number of line buffer memories 6J, 6K is reduced to a minimum number of 2, as compared with the arrangement shown in FIG. 11, but the image reading system 10 is capable of processing image data at high speed, i.e., in real-time, at the same level as the arrangement shown in FIG. 11. The image reading system 10 is less expensive than the arrangement shown in FIG. 11 which requires as many line buffer memories as corrective line quantities, and uses a smaller printed wiring board which supports the line buffer memories.

The number of line buffer memories connected between the A/D converters 5R, 5B and the interpolator 33 may be two or three.

While the present invention is directed to the 3-line image sensor 1 in the illustrated embodiment, the principles of the present invention are also applicable to a 2-line image sensor or a plural-line image sensor comprising a plurality of linear image sensors more than three linear image sensors.

With the present invention, corrective line quantities are determined, and decimal-part corrective line quantities thereof are interpolated in real-time, and integer-part corrective line quantities thereof are stored in a memory with their addresses changed. Therefore, a 3-line image sensor uses minimum two line buffer memories for equalizing image data with respect to reading positions, and the image data can be stored in the memory at high speed. Each of the line buffer memories may comprise a semiconductor memory, and the memory for storing the image data may comprise a hard disk, a magnetooptical disk, or the like.

The distances between the R, G, B linear image sensors on the surface of the 3-line image sensor are divided by the optical magnification of the focusing optical system to calculate the distances between the R, G, B linear image sensors on the surface of the subject, and the calculated distances are divided by the scanning pitch in the auxiliary scanning direction to produce the corrective line quantities. Therefore, the corrective line quantities can easily be determined.

A single reference line extending in the main scanning direction is two-dimensionally read by the 3-line image sensor, and image data files for respective pixels on each main scanning line are generated. Based on the generated image data files, line deviations in the auxiliary scanning direction between pixels of the reference linear image sensor and pixels of the same pixel numbers of the remaining two linear image sensors are calculated. The calculated line deviations are divided into integer-part corrective line quantities and decimal-part corrective line quantities, thus producing corrective line quantities. Therefore, it is possible to determine, with ease, accurate corrective line quantities for actual image reading systems, taking into account the magnification of the focusing optical system.

If the present invention is applied to a 3-line image sensor, then only two line buffer memories may be used, and hence the cost thereof is minimized. The line buffer memories and an interpolator combined therewith are capable of calculating only the decimal-part corrective line quantities in real-time. When the decimal-part corrective line quantities are stored in the memory, their addresses are changed depending on the integer-part corrective line quantities. Consequently, image data can immediately be generated as files that can be utilized with ease.

Furthermore, it is possible to generate high-quality image data, i.e., highly fine image data of high resolution, in real-time, i.e., at high speed, with the minimum two line buffer memories associated with the 3-line image sensor.

The principles of the present invention as they are incorporated in an image reading system are also effective to increase the productivity of the image reading system.

What is claimed is:

1. A method of storing image data by leading light containing image information carried by a subject through a focusing optical system to a plural-line image sensor having at least two linear image sensors juxtaposed on a substrate, scanning the subject with the plural-line image sensor in a main scanning direction, feeding the subject in an auxiliary scanning direction with respect to the plural-line image sensor thereby to two-dimensionally read the image information carried by the subject, converting the read image information into digital image data with A/D converters, equalizing the image data with respect to reading positions in the auxiliary scanning direction of the linear image sensors, and storing the image data in a memory, said method comprising the steps of:

(a) determining deviations of reading positions in the auxiliary scanning direction on the subject between the linear image sensor as a reference linear image sensor and the other linear image sensor, as corrective line quantities divided as integer-part corrective line quantities and decimal-part corrective line quantities;

(b) successively obtaining image data of the reference linear image sensor for respective main scanning lines, obtaining image data of the other linear image sensor through at least one line buffer memory, interpolating the image data stored in the line buffer memory and image data which is presently read that is to be stored in the line buffer memory, processing only the decimal-part corrective line quantities for successively obtaining interpolated image data for the respective main scanning lines; and (c) changing addresses of the interpolated image data by said integer-part corrective line quantities to equalize the interpolated image data in the reading positions to the image data of the reference linear image sensor,r and storing the image data as a file in said memory.

2. A method according to claim 1, wherein said step (a) comprises the step of dividing distances between the linear image sensors on the plural-line image sensor by an optical magnification of the focusing optical system thereby to calculate distances between the linear image sensors on the subject, and dividing the calculated distances by a scanning pitch in the auxiliary scanning direction thereby to calculate said corrective line quantities.

3. A method according to claim 1, wherein said step (a) comprises the step of two-dimensionally reading a single reference line extending in the main scanning direction on the subject with said plural-line image sensor to generate image data files for respective pixels on each main scanning line, calculating line deviations in the auxiliary scanning direction between pixels of the reference linear image sensor and pixels of the same pixel numbers of the other linear image sensor, and dividing the calculated line deviations into said corrective line quantities divided as said integer-part corrective line quantities and said decimal-part corrective line quantities.

4. A method of storing image data by leading light containing image information carried by a subject through a focusing optical system to a 3-line image sensor having R, G, B linear image sensors juxtaposed on a substrate, scanning the subject with the 3-line image sensor in a main scanning direction, feeding the subject in an auxiliary scanning direction with respect to the 3-line image sensor thereby to two-dimensionally read the image information carried by the subject, converting the read image information into digital image data with A/D converters, equalizing the image data with respect to reading positions in the auxiliary scanning direction of the linear image sensors, and storing the image data in a memory, said method comprising the steps of:

(a) determining deviations of reading positions in the auxiliary scanning direction on the subject between the linear image sensor as a reference linear image sensor and the other linear image sensors, as corrective line quantities divided as integer-part corrective line quantities and decimal-part corrective line quantities;

(b) successively obtaining image data of the reference linear image sensor for respective main scanning lines, obtaining image data of the other linear image sensors through at least one line buffer memory, interpolating the image data stored in the line buffer memory and image data which is presently read that is to be stored in the line buffer memory, processing only the decimal-part corrective line quantities for successively obtaining interpolated image data for the respective main scanning lines; and (c) changing addresses of the interpolated image data by said integer-part corrective line quantities to equalize the interpolated image data in the reading positions to the image data of the reference linear image sensor, and storing the image data as a file in said memory.

5. A method according to claim 4, wherein said step (a) comprises the step of dividing distances between the R, G, B linear image sensors on the 3-line image sensor by an optical magnification of the focusing optical system thereby to calculate distances between the R, G, B linear image sensors on the subject, and dividing the calculated distances by a scanning pitch in the auxiliary scanning direction thereby to calculate said corrective line quantities.

6. A method according to claim 4, wherein said step (a) comprises the step of two-dimensionally reading a single reference line extending in the main scanning direction on the subject with said 3-line image sensor to generate image data files for respective pixels on each main scanning line, calculating line deviations in the auxiliary scanning direction between pixels of the reference linear image sensor and pixels of the same pixel numbers of the other two linear image sensors, and dividing the calculated line deviations into said corrective line quantities divided as said integer-part corrective line quantities and said decimal-part corrective line quantities.

7. An apparatus for storing image data by leading light containing image information carried by a subject through a focusing optical system to a plural-line image sensor having at least two linear image sensors juxtaposed on a substrate, scanning the subject with the plural-line image sensor in a main scanning direction, feedinG, the subject in an auxiliary scanning direction with respect to the plural-line image sensor thereby to two-dimensionally read the image information carried by the subject, converting the read image information into digital image data with A/D converters, equalizing the image data with respect to reading positions in the auxiliary scanning direction of the linear image sensors, and storing the image data in a memory, said apparatus comprising:

a memory for being directly supplied with output data from one of said linear image sensors as a reference linear image sensor, through a corresponding one of the A/D converters;

at least one line buffer memory connected to the other A/D converter which is connected to the other linear image sensor;

an interpolator connected between said line buffer memory and said memory; and a drive controller for controlling said linear image sensors, said A/D converters, said line buffer memory, said interpolator, and said memory to hold deviations of reading positions in the auxiliary scanning direction on the subject between the reference linear image sensor and the other linear image sensor, as corrective line quantities divided as integer-part corrective line quantities and decimal-part corrective line quantities, to successively store image data of the reference linear image sensor for respective main scanning lines in said memory, to interpolate the image data stored in the line buffer memory and image data which is presently read that is to be stored in the line buffer memory, with the interpolator depending on the decimal-part corrective line quantities for successively obtaining interpolated image data for the respective main scanning lines, to change addresses of the interpolated image data by said integer-part corrective line quantities to equalize the interpolated image data in the reading positions to the image data of the reference linear image sensor, and to store the image data as a file in said memory.

8. An apparatus according to claim 7, wherein said drive controller comprises means for dividing distances between the linear image sensors on the plural-line image sensor by an optical magnification of the focusing optical system thereby to calculate distances between the linear image sensors on the subject, and dividing the calculated distances by a scanning pitch in the auxiliary scanning direction thereby to calculate said corrective line quantities.

9. An apparatus according to claim 7, wherein said drive controller comprises means for two-dimensionally reading a single reference line extending in the main scanning direction on the subject with said plural-line image sensor to generate image data files for respective pixels on each main scanning line, calculating line deviations in the auxiliary scanning direction between pixels of the reference linear image sensor and pixels of the same pixel numbers of the other linear image sensor, and dividing the calculated line deviations into said corrective line quantities divided as said integer-part corrective line quantities and said decimal-part corrective line quantities.

10. An apparatus for storing image data by leading line containing image information carried by a subject through a focusing optical system to a 3-line image sensor having R, G, B linear image sensors juxtaposed on a substrate, scanning the subject with the 3-line image sensor in a main scanning direction, feeding the subject in an auxiliary scanning direction with respect to the 3-line image sensor thereby to two-dimensionally read the image information carried by the subject, converting the read image information into digital image data with A/D converters, equalizing the image data with respect to reading positions in the auxiliary scanning direction of the R, G, B linear image sensors, and storing the image data in a memory, said apparatus comprising:

a memory for being directly supplied with output data from one of said linear image sensors as a reference linear image sensor, through a corresponding one of the A/D converters;

at least two line memories connected to the other A/D converters which are connected to the other linear image sensors;

an interpolator connected between said line buffer memories and said memory; and a drive controller for controlling said linear image sensors, said A/D converters, said line buffer memories, said interpolator, and said memory to hold deviations of reading positions in the auxiliary scanning direction on the subject between the reference linear image sensor and the other linear image sensors, as corrective line quantities divided as integer-part corrective line quantities and decimal-part corrective line quantities, to successively store image data of the reference linear image sensor for respective main scanning lines in said memory, to interpolate the image data stored in the line buffer memories and image data which is presently read that is to be stored in the line buffer memories, with the interpolator depending on the decimal-part corrective line quantities for successively obtaining interpolated image data for the respective main scanning lines, to change addresses of the interpolated image data by said integer-part corrective line quantities to equalize the interpolated image data in the reading positions to the image data of the reference linear image sensor, and to store the image data as a file in said memory.

11. An apparatus according to claim 10, wherein said drive controller comprises means for dividing distances between the linear image sensors on the 3-line image sensor by an optical magnification of the focusing optical system thereby to calculate distances between the linear image sensors on the subject, and dividing the calculated distances by a scanning pitch in the auxiliary scanning direction thereby to calculate said corrective line quantities.

12. An apparatus according to claim 10, wherein said drive controller comprises means for two-dimensionally reading a single reference line extending in the main scanning direction on the subject with said 3-line image sensor to generate image data files for respective pixels on each main scanning line, calculating line deviations in the auxiliary scanning direction between pixels of the reference linear image sensor and pixels of the same pixel numbers of the other linear image sensors, and dividing the calculated line deviations into said corrective line quantities divided as said integer-part corrective line quantities and said decimal-part corrective line quantities.

* * * * *